(12) United States Patent
Lim

(10) Patent No.: US 6,519,251 B1
(45) Date of Patent: Feb. 11, 2003

(54) APPARATUS AND METHOD FOR INTERCONNECTING PRIVATE EXCHANGE SYSTEM TO THE INTERNET

(75) Inventor: Pyung-Bin Lim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/327,619

(22) Filed: Jun. 8, 1999

(30) Foreign Application Priority Data

Jun. 8, 1998 (KR) .......................................... 98-21097

(51) Int. Cl.[7] .............................................. H04L 12/66
(52) U.S. Cl. ........................ 370/352; 370/466; 709/200
(58) Field of Search ................................ 370/351–354, 370/357, 386, 389, 392, 400, 401, 419, 420, 437, 445, 447, 463; 709/200, 217, 218, 219, 220, 224, 225, 227, 230, 245, 249, 250

(56) References Cited

U.S. PATENT DOCUMENTS

| | | | | |
|---|---|---|---|---|
| 5,287,103 A | * | 2/1994 | Kasprzyk et al. | ...... 340/825.52 |
| 5,526,489 A | * | 6/1996 | Nilakantan et al. | .... 340/825.52 |
| 5,621,884 A | | 4/1997 | Besheers et al. | |
| 5,715,304 A | * | 2/1998 | Nishida et al. | ........ 379/114.02 |
| 5,802,285 A | | 9/1998 | Hirviniemi | |
| 5,875,176 A | | 2/1999 | Sherer et al. | |
| 5,892,764 A | | 4/1999 | Riemann et al. | |
| 5,903,571 A | * | 5/1999 | Koepper et al. | ............. 370/524 |
| 6,044,082 A | * | 3/2000 | Nyg.ang.rd et al. | ......... 370/437 |
| 6,061,739 A | * | 5/2000 | Reed et al. | .................. 370/447 |
| 6,195,706 B1 | * | 2/2001 | Scott | ........................... 709/220 |
| 6,307,853 B1 | * | 10/2001 | Storch et al. | ............... 370/354 |
| 6,307,931 B1 | * | 10/2001 | Vaudreuil | .................... 370/352 |
| 6,363,065 B1 | * | 3/2002 | Thornton et al. | ........... 370/352 |
| 6,385,191 B1 | * | 5/2002 | Coffman et al. | ............ 370/352 |
| 6,389,005 B1 | * | 5/2002 | Cruickshank | ............... 370/352 |

OTHER PUBLICATIONS

Document consisting of pages downloaded from the internet regarding a product called "Internet PhoneJACK" by Quicknet Technologies INc.

* cited by examiner

*Primary Examiner*—Hassan Kizou
(74) *Attorney, Agent, or Firm*—Robert E. Bushnell, Esq.

(57) ABSTRACT

An apparatus and method for interconnecting a private exchange to the Internet. A card allocated with an intrinsic Ethernet address is included in a private exchange. The private exchange is allocated with an Internet protocol (IP) address corresponding to the Ethernet address from a maintenance administration personal computer to which the private exchange is connected via an Ethernet network. By this IP address, the private exchange is interconnected to the Internet. In accordance with the present invention, therefore, the private exchange utilizes both the public network and Internet by virtue of the IP address allocated thereto.

7 Claims, 4 Drawing Sheets

APPARATUS AND METHOD FOR INTERCONNECTING PRIVATE EXCHANGE SYSTEM TO THE INTERNET

CLAIM OF PRIORITY

This application makes reference to, incorporates the same herein, and claims all benefits accruing under 35 U.S.C §119 from an application entitled Apparatus And Method For Interconnecting Private Exchange System To The Internet earlier filed in the Korean Industrial Property Office on Jun. 8, 1998, and there duly assigned Serial No. 98-21097 by that Office.

BACKGROUND OF THE INVENTION

1. Field of the Invention

The present invention relates to an apparatus and method for interconnecting a private exchange system (PBX) to the Internet, and more particularly to an apparatus and method for allocating an Internet protocol (IP) address to a card included in a private exchange, thereby interconnecting the private exchange to the Internet.

2. Description of the Related Art

As well known, the Internet, which is a network interconnecting numerous networks worldwide, interconnects numerous companies, schools, and government and public offices, etc. via those networks throughout the world. The Internet enables the transfer of information among various networks using some standard protocols such as the Transmission Control Protocol/Internet Protocol (TCP/IP). Since the Internet has an open nature and a compatibility, the use there)f is greatly increasing. A variety of communication services are implemented using the Internet in that the Internet provides an architecture capable of transferring a variety of information.

Among a variety of communication services implemented by virtue of the above mentioned characteristics of the Internet, a service for transmitting voice in real time over the Internet has recently been emphasized. A representative example of such a voice transmission service is an Internet telephony service which is a technique for enabling a telephone duplex voice conversation over the Internet. By virtue of developments of audio processing techniques and techniques for interconnecting public telephone networks to the Internet, such an Internet telephony service has been advanced to a level enabling public telephone users as well as computers connected to the Internet to utilize international call services or toll call services over the Internet. In the future, the use of Internet telephony services will be greatly increased because it provides an advantage in that international call services and toll call services can be utilized while needing to pay only the Internet service charge.

Also, an activation of Internet telephony services will result in an extended application of such Internet telephony services to terminals subscribed to conventional public telephone networks in so far as those terminals are interconnectable to the Internet. In particular, where private changes used in general companies and offices are interconnectable to the Internet, such Internet telephony services will be emphasized more in accordance with a correspondingly increased usefulness of the Internet. Through private exchanges, which are main facilities for business in general companies and offices and connected to public telephone networks, various telephone services such as international calls, toll calls and facsimile transmissions are frequently used for business. However, such telephone services through private exchanges involve a high service charge. As a method for solving such a problem, Internet telephony services may be proposed.

However, it has been impossible to achieve an extended application of Internet telephony services to conventional private exchanges. Referring to FIG. 1, a private exchange 110, which has a conventional configuration, is illustrated. As shown in FIG. 1, the private exchange is interconnected to a public switched telephone network (PSTN) 100 and serves to conduct services for transmitting voice and data to digital phones 111 and general subscribers 11 n over the PSTN 100. Since such a conventional private exchange does not utilize any IP network, it has no function associated with allocation of IP addresses and routing. In other words, such a conventional private exchange system cannot access any general purpose IP network, so that it cannot utilize the inexpensive Internet network. Furthermore, conventional private exchanges as mentioned above should be equipped with a separate Internet connection unit in order to utilize Internet telephony services such as telephone call services and facsimile transmission services over the Internet.

Incorporated herein by reference are U.S. Pat. No. 5,892,764 to Ernst B. Riemann et al. entitled ATM LAN Telephone System having described therein a LAN (local area network) system having a PBX function and includes a PBX network call control interface, a socket-based programming interface that allows messages to be sent and received directly across a server bus to a control processor in a multi-port PSTN module, and also to communicate with remote telephony modules via a similar socket-based mechanism that sends messages across an ATM (asynchronous transfer mode) network using a standard protocol such as TCP/IP. This same interface can also be used to send messages across the Internet to control remote telephony resources at any other location also connected to the Internet; U.S. Pat. No. 5,875,176 to William Paul Sherer et al. entitled Network Adaptor Driver With Destination Based Ordering describes a system which is useful in LAN networking and WAN (wide area network) internetworking applications. In a LAN, data is generally transmitted between end systems as independent packets, with each packet containing a header having at least a destination address specifying an ultimate destination and generally also having a source address and other transmission information such as transmission priority. An end system generally listens continuously to the destination addresses of all packets that are transmitted on their segments, but only fully receive a packet when its destination address matches the end system's address and when the end system is interested in receiving the information contained in that packet. Sherer et al. teaches an Ethernet packet that has an Ethernet header and a 48-bit Ethernet address (such as 00:85:8C:13:AA ), and an Ethernet trailer. Within the Ethernet packet is contained, or encapsulated, an IP packet, represented by an IP header containing a 32 bit IP address (such as 199.22.120.33); U.S. Pat. No. 5,802,285 to Seppo Hirviniemi entitled Wide Area Network (WAN) Interface For A Transmission Control Protocol/InternetProtocol (TCP/IP) In A Local Area Network (LAN) having TCP/IP software which uses a lower-level address resolution protocol (ARP) protocol to find a physical network addresses corresponding to a logical Internet protocol (IP) address; and U.S. Pat. No. 5,621,884 to Norman J. Beshears et al. entitled Distributed Data Access System Including A Plurality Of Database Access Processors With One-for-n Redundancy discusses conventional routers wherein routing takes place at the IP addressing level beneath which the link layer (Ethernet) has separate address assignments. To accommodate both layers, each router maintains two tables—a routing table and an ARP (address resolution protocol) table. The routing table is used to determine how to route to a remote IP address, while the ARP table is used to determine what Ethernet address needs to be used to get to the given IP address.

SUMMARY OF THE INVENTION

Therefore, an object of the invention is to provide an apparatus and method for interconnecting a private exchange system to the Internet.

Another object of the invention is to provide an apparatus and method for allocating in IP address to a private exchange in order to interconnect the private exchange to an IP network.

In accordance with one aspect, the present invention provides an Internet connection apparatus for interconnecting a private exchange to the Internet, the apparatus being included in the private exchange and connected to a maintenance administration personal computer adapted to is allocate an IP address corresponding to an Ethernet address of the apparatus, comprising: an Ethernet connection unit connected to an Ethernet, the Ethernet connection unit having an intrinsic Ethernet address; a PCM (pulse code modulation) interface unit for transmitting and receiving PCM data with respect to a subscriber connected to the private exchange; a main interface unit for transmitting and receiving data and control signals with respect to a main control unit of the private exchange; a data process unit for compressing data transmitted from the PCM interface unit, and transmitting the compressed data to the Ethernet connection unit; and a control unit connected to the Ethernet connection unit, the PCM interface unit, the main interface unit, and the data process unit, respectively, the control unit serving to control operations of the units connected therewith in response to the control signals transmitted from the main interface unit.

In accordance with another aspect, the present invention provides a method for interconnecting a private exchange system to the Internet, the private exchange system including at least an Ethernet connection unit having an intrinsic Ethernet address and serving to connect the private exchange system to a maintenance administration personal computer, comprising the steps of: transmitting the intrinsic Ethernet address from the Ethernet connection unit to the maintenance administration personal computer via the Ethernet to which the Ethernet connection unit is connected; allocating to the Ethernet connection unit an IP address from the work station corresponding to the transmitted Ethernet address via the Ethernet; and connecting the private exchange system to the Internet by the Ethernet connection unit while using the allocated IP address.

When a private exchange, to which the present invention is applied, is connected to an Ethernet by its internal Ethernet connection unit, it sends its intrinsic Ethernet address to the network, so that it is allocated with an IP address corresponding to the Ethernet address from a maintenance administration personal computer to which the private exchange is connected via the network.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
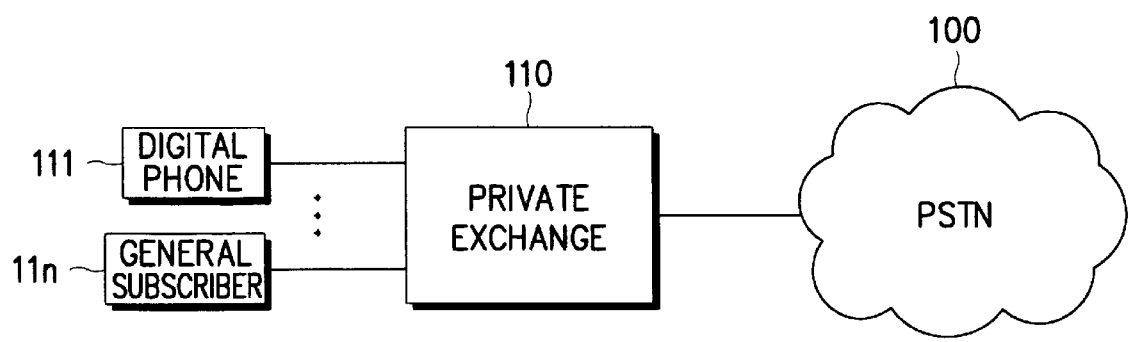
FIG. 1 is a block diagram illustrating a general private exchange network.
Figure 2:
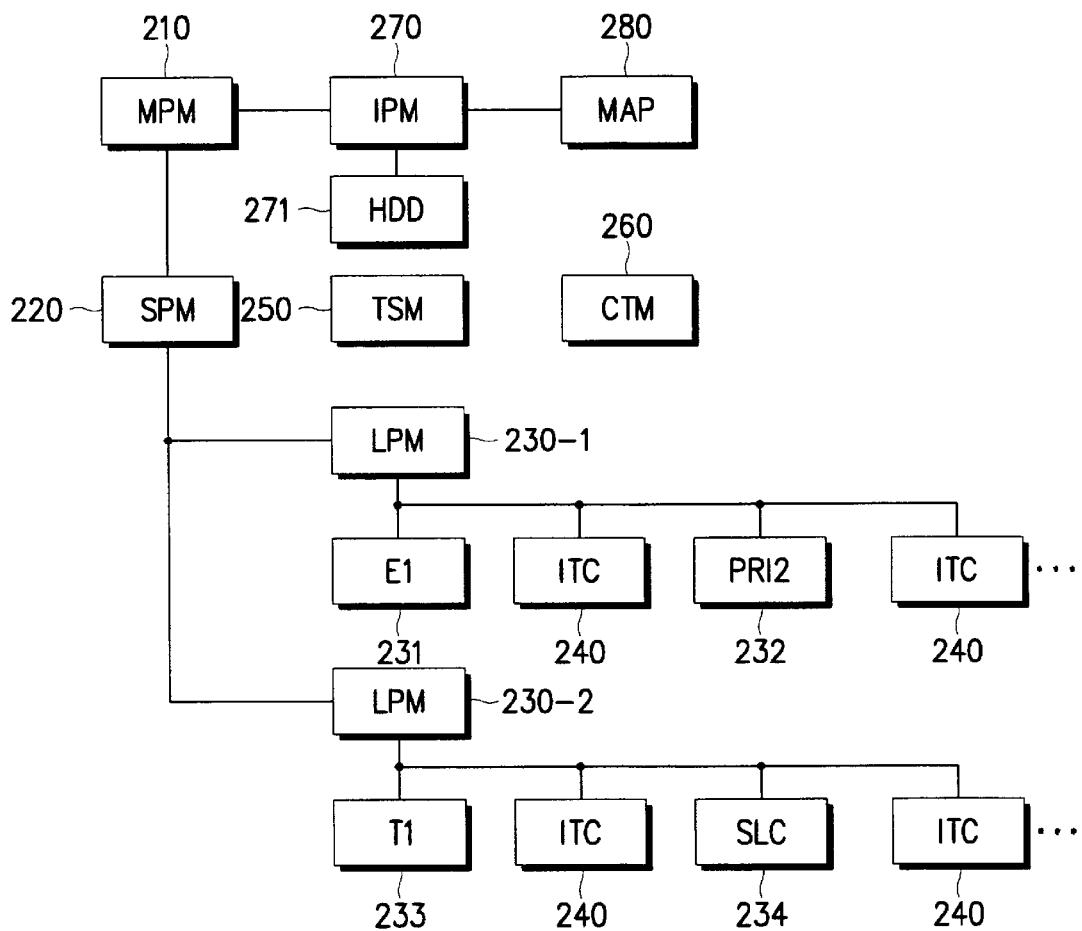
FIG. 2 is a block diagram illustrating a private exchange system according to an embodiment of the present invention.

Reference will now be made in detail to the preferred embodiments of the present invention. FIG. 2 is a block diagram illustrating a private exchange system according to an embodiment of the present invention. Referring to FIG. 2, the private exchange system includes a main process module 210, a signal process module 220, a plurality of line process modules 230-1, 230-2, . . . , a plurality of line cards 231 to 240, a time switch module 250, a clock/tone module 260, an input/output process module 270, a hard disk drive 271 and a maintenance administration personal computer 280.

Figure 3:
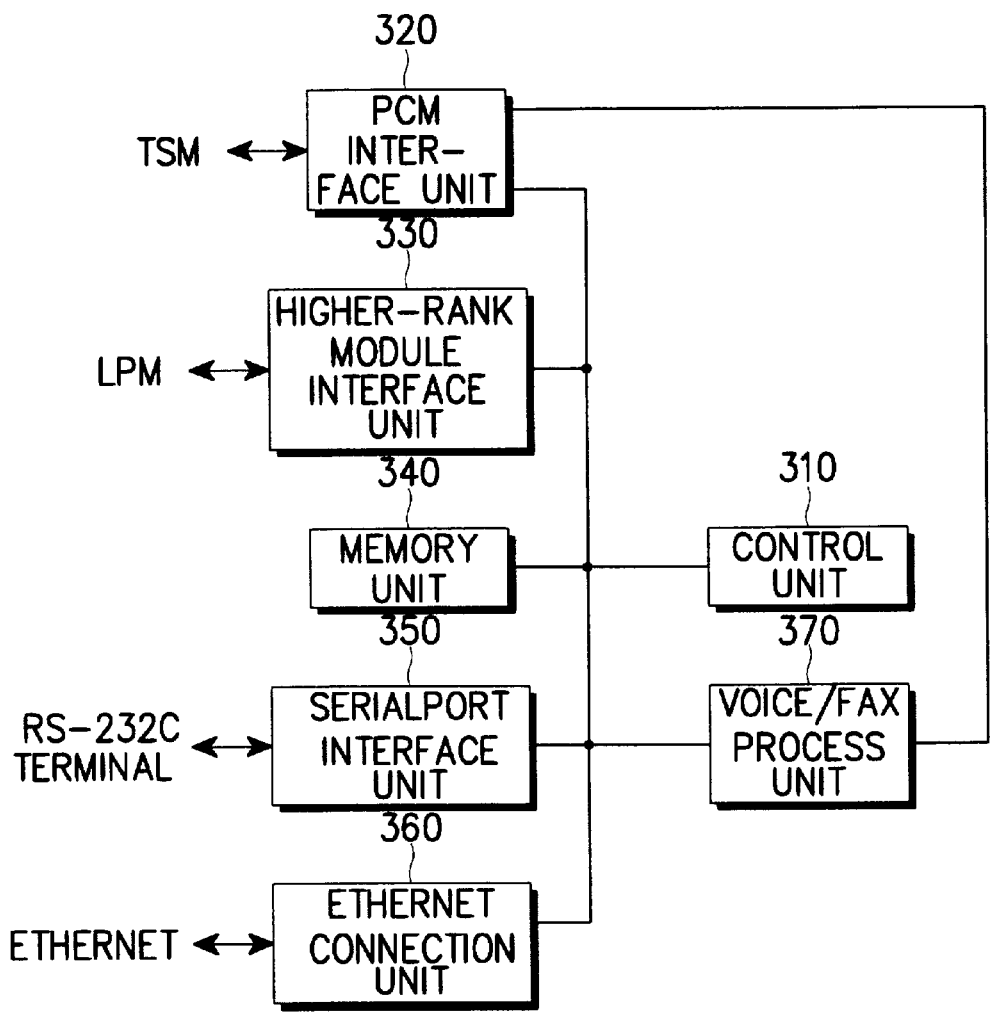
FIG. 3 is a block diagram illustrating an apparatus for interconnecting the private exchange to the Internet in accordance with a preferred embodiment of the present invention.

Now, the operation of the private exchange system according to the illustrated embodiment of the present invention will be briefly described in conjunction with FIG. 2. The main process module 210 (referred to as "MPM" in the drawing) serves to control the overall operation of the private exchange. The signal process module 220 (referred to as "SPM" in the drawing) monitors and controls the states of the line process modules 230-1, 230-2, . . . under the control of the main process module 210. The signal process module 220 sends data resulting from the monitoring and control operations there of to the main process module 210. Each of the line process modules 230-1, 230-2, . . . (referred to as "LPM" in the drawing) checks the states of the line cards (referred to as "E1", "PR12", "T1", "SLC", and "ITC" in the drawing) connected thereto under the control of the signal process module 220 and sends the resultant data to the signal process module 220. Among the line cards, the Internet telephony cards 240 (referred to as "ITC" in the drawing) are Internet connection units internally included in the private exchange to interconnect the private exchange to the Internet. The private exchange may have a plurality of Internet telephony cards respectively allocated with different Ethernet addresses. The Internet telephony cards 240 have a configuration as shown in FIG. 3, described in detail below. Each Internet telephony card 240 is allocated with an IP address corresponding to an Ethernet address from a maintenance administration personal computer 280, thereby serving to conduct interfacing of signals between the Internet and the private exchange. The time switch module 250 (referred to as "TSM" in FIGS. 2 and 3) conducts switching of signals including voice and data among the line cards 231 to 240 under the control of the main process module 210. The clock/tone module 260 (referred to as "CTM" in FIG. 2) generates clock and tone signals required for the operation of the private exchange and sends the generated signals to desired modules and cards. The input/output process module 270 (referred to as "IPM" in FIG. 2) sends data supplied from the main process module 210 to the maintenance administration personal computer 280 while sending data supplied from the maintenance administration personal computer 280 to the main process module 210. The maintenance administration personal computer 280 (referred to as "MAP" in FIG. 2) performs a maintenance and administration operation for the private exchange connected thereto via the input/output process module 270. The above mentioned maintenance administration personal computer 280 is a personal computer allocating the Internet address. At this time, the maintenance administration personal computer 280 which includes at least a database corresponding to the internal Ethernet address and the IP address, allocates to the Internet telephony card 240 the IP address corresponding to the Ethernet address transmitted from the Internet telephony card 240.

FIG. 3 is a block diagram illustrating the configuration of each Internet telephony card 240 shown in FIG. 2. As shown in FIG. 3, the Internet telephony card 240 includes a control unit 310, a PCM interface unit 320, a higher-rank module interface unit 330, a memory unit 340, a serial port interface unit 350, and an Ethernet connection unit 360.

Now, the overall operation of each Internet telephony card 240 included in the private exchange to interconnect the private exchange to the Internet in accordance with the illustrated embodiment of the present invention will be described in conjunction with FIGS. 2 and 3. The control unit 310 controls the overall operation of the Internet telephony card 240 according to the embodiment of the present invention. The PCM interface unit 320 sends PCM data from the time switch module 250 to a voice/fax process unit 370 the under the control of the control unit 310. The higher-rank module interface unit 330 sends data and control signals from an associated one of the line processor modules 230 to the control unit 310. The higher-rank module interface unit 330 also transmits to the associated line processor module 230 data generated during the operation of the Internet telephony card 240 and a signal indicative of the state of the Internet telephony card 240. The memory unit 340 is stored with a control program and data for controlling the operation of the Internet telephony card 240 according to the embodiment of the present invention. The memory unit 340 may comprise flash memories, static RAMs, and dynamic RAMs. The memory unit 340 also stores therein data generated during the operation of the Internet telephony card 240. The serial port interface unit 350 is connected to an RS-232C terminal through its serial port so as to conduct interfacing of data transmitted and received between the Internet telephony card 240 and the terminal. The Ethernet connection unit 360 bears an intrinsic Ethernet address and is connected to an Ethernet so as to conduct interfacing of data transmitted and received between the Internet telephony card 240 and Ethernet. The Ethernet connection unit 360 is also allocated with an IP address corresponding the Ethernet address from the maintenance administration personal computer 280 to which the Ethernet connection unit 360 is connected via an Ethernet. The voice/fax process unit 370 compresses voice or data transmitted from the PCM interface unit 320, and then sends the resultant data to the Ethernet via the Ethernet connection unit 360.

Figure 4:
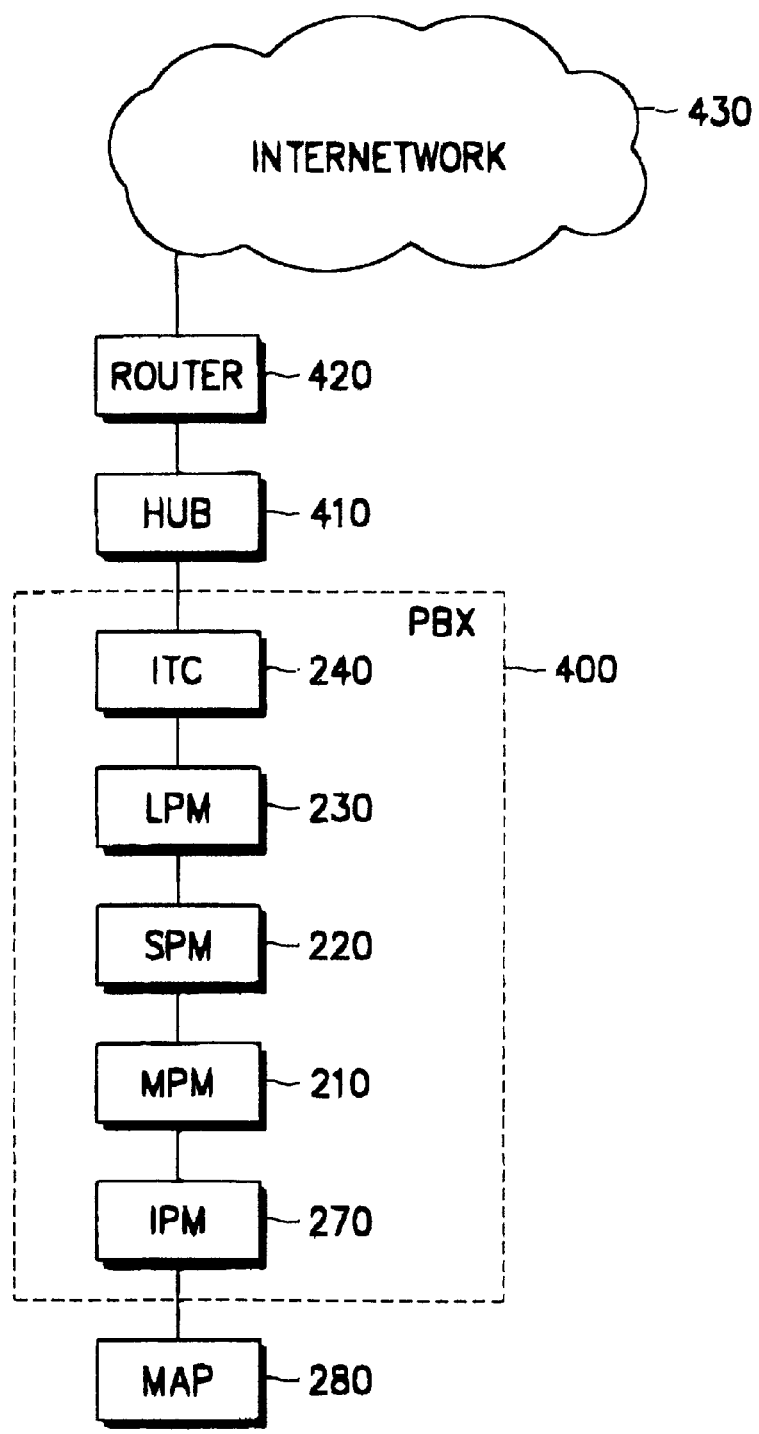
FIG. 4 is a block diagram illustrating a private exchange network interconnected to the Internet in accordance with the present invention.

FIG. 4 is a block diagram illustrating the configuration of the private exchange network interconnecting the Internet in accordance with an embodiment of the present invention. As shown in FIG. 4, the Internet telephony card 240 of the private exchange 400 is connected to the Internet 430 via a hub 410 and a router 420.

A method for allocating an IP address to the Internet telephony card 240, which is a unit for connecting the private exchange to the Internet, will be described in conjunction with FIGS. 2 to 4. When the private exchange 400, in which the Internet telephony card 240 is included, is powered on, the Internet telephony card 240 sends an Ethernet address to the line process module 230. At this time, the Ethernet address is an intrinsic Ethernet address. That is, Internet telephony cards 240 have different Ethernet addresses, respectively. The line process module 230 then transmits the Ethernet address received from the Internet telephony card 240 to the maintenance administration personal computer 280 via the signal process module 220, main process module 210 and input/output process module 270. The maintenance administration personal computer 280 identifies the Ethernet address transmitted from the input/output process module 270 and then searches its internal database for an IP address corresponding the Ethernet address. The maintenance administration personal computer 280 then allocates the IP address to the Internet telephony card 240. Accordingly, the Internet telephony card 240 is allocated with the IP address, corresponding to its intrinsic Ethernet address, from the maintenance administration personal computer 280, so that Internet telephony card 240 may be interconnected with the Internet 430 by the allocated IP address via hub 410 and router 4.20. In particular, the Internet telephony card 240 can always receive from the maintenance administration personal computer 280 an IP address corresponding to the Ethernet address in accordance with a reversed address resolution protocol (RARP).

As apparent from the above description, the present invention makes it possible to achieve allocation of IP addresses corresponding to respective intrinsic Ethernet addresses of Internet telephony cards included in a private exchange, thereby enabling the private exchange to be interconnected to the Internet. In accordance with the present invention, IP addresses allocated to the Internet telephony cards can always be those respectively translated in association with networks connected to the Internet telephony cards because the Internet telephony cards have their intrinsic Ethernet addresses, respectively. Furthermore, in accordance with the present invention, a remote access is possible because the private exchange system is interconnected to the Internet via LANs. Accordingly, it is possible to manage the private exchange system at a remote place. Thus, the maintenance and administration of the private exchange system can be more easily carried out. In addition, the present invention provides an advantage in that the costs of communications is reduced because voice and data can be transmitted through the private exchange and the Internet.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An Internet connection apparatus comprising:
   apparatus for interconnecting a private exchange to the Internet, the apparatus being included in the private exchange and connected via an Ethernet network to a maintenance administration personal computer adapted to allocate an Internet protocol address corresponding to an Ethernet address of the apparatus, said apparatus comprising:
   an Ethernet connection unit connected to the Ethernet, said Ethernet connection unit having an intrinsic Ethernet address;

a pulse code modulation interface unit for transmitting and receiving pulse code modulation data with respect to a subscriber connected to said private exchange;

a main interface unit for transmitting and receiving data and control signals with respect to a main control unit of said private exchange;

a data process unit for compressing data transmitted from said pulse code modulation interface unit, and transmitting said compressed data to said Ethernet connection unit; and a control unit connected to said Ethernet connection unit, said pulse code modulation interface unit, said main interface unit, and said data process unit, respectively, said control unit serving to control operations of said units connected therewith in response to said control signals transmitted from said main interface unit.

2. The Internet connection apparatus in accordance with claim 1, further comprised of said Ethernet connection unit transmitting said Ethernet address to said maintenance administration personal computer via said Ethernet connected thereto, so that said Ethernet connection unit is allocated with an Internet protocol address corresponding to said Ethernet address from said maintenance administration personal computer.

3. A method comprising a step of:

interconnecting a private exchange system to the Internet, the private exchange system including at least one Internet telephone card, said Internet telephone card comprising an Ethernet connection unit having an intrinsic Ethernet address and serving to connect the private exchange system to a maintenance administration personal computer via an Ethernet, said step of interconnecting comprising the steps of:

transmitting said intrinsic Ethernet address from said Ethernet connection unit to said maintenance administration personal computer via said Ethernet;

allocating to said Ethernet connection unit, via said Ethernet, an Internet protocol address from said maintenance administration personal computer corresponding to said transmitted intrinsic Ethernet address; and using said allocated Internet protocol address to connect said private exchange system to the Internet by said Ethernet connection unit.

4. An Internet connection apparatus comprising:

an Internet telephony card for interconnecting a private exchange to the Internet, the Internet telephony card being included in the private exchange and connected via an Ethernet network to a maintenance administration personal computer adapted to allocate an Internet protocol address corresponding to an Ethernet address of the Internet telephony card, said Internet telephony card comprising:

an Ethernet connection unit connected to the Ethernet, said Ethernet connection unit having an intrinsic Ethernet address;

a pulse code modulation interface unit for transmitting and receiving pulse code modulation data with respect to a subscriber connected to said private exchange;

a main interface unit for transmitting and receiving data and control signals with respect to a main control unit of said private exchange;

a data process unit for compressing data transmitted from said pulse code modulation interface unit, and transmitting said compressed data to said Ethernet connection unit; and a control unit connected to said Ethernet connection unit, said pulse code modulation interface unit, said main interface unit, and said data process unit, respectively, said control unit serving to control operations of said units connected therewith in response to said control signals transmitted from said main interface unit.

5. The Internet connection apparatus in accordance with claim 4, further comprised of:

said Ethernet connection unit transmitting said intrinsic Ethernet address to said maintenance administration personal computer via said Ethernet connected thereto;

said maintenance administration personal computer allocating the Internet protocol address corresponding to said intrinsic Ethernet address to said Ethernet connection unit; and a hub and a router, respectively connected in series between said Internet telephony card and said Internet, for connecting said Internet telephony card to said Internet according to said Internet protocol address allocated to said Ethernet connection unit by said maintenance administration personal computer.

6. The Internet connection apparatus as set forth in claim 4, further comprising more than one said Internet telephony card, each said Internet telephony card comprising a respective Ethernet connection unit connected to the Ethernet, each said Ethernet connection unit having a distinct intrinsic Ethernet address.

7. The Internet connection apparatus as set forth in claim 5, further comprising more than one said Internet telephony card, each said Internet telephony card comprising a respective Ethernet connection unit connected to the Ethernet, each said Ethernet connection unit having a distinct intrinsic Ethernet address, said maintenance administration personal computer allocating respective distinct Internet protocol address corresponding to each said intrinsic Ethernet address to each said Ethernet connection unit.

* * * * *